(12) United States Patent
Sugioka et al.

(10) Patent No.: US 11,445,377 B2
(45) Date of Patent: Sep. 13, 2022

(54) COMMUNICATION SYSTEM

(71) Applicant: NORITZ CORPORATION, Hyogo (JP)

(72) Inventors: Masayuki Sugioka, Kusatsu (JP);
Yoshihiko Maekawa, Akashi (JP);
Tsuyoshi Yamashita, Hyogo (JP);
Masaru Ono, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 379 days.

(21) Appl. No.: 16/497,440

(22) PCT Filed: Mar. 23, 2018

(86) PCT No.: PCT/JP2018/011651
§ 371 (c)(1),
(2) Date: Sep. 24, 2019

(87) PCT Pub. No.: WO2018/186204
PCT Pub. Date: Oct. 11, 2018

(65) Prior Publication Data
US 2021/0329463 A1     Oct. 21, 2021

(30) Foreign Application Priority Data

Apr. 7, 2017  (JP) .............................. JP2017-076697
Apr. 7, 2017  (JP) .............................. JP2017-076787

(51) Int. Cl.
*H04W 12/71*    (2021.01)
*H04W 12/61*    (2021.01)
*H04L 12/28*    (2006.01)

(52) U.S. Cl.
CPC ......... *H04W 12/71* (2021.01); *H04L 12/2803* (2013.01); *H04W 12/61* (2021.01); *H04L 2012/2841* (2013.01)

(58) Field of Classification Search
CPC ............ H04L 12/2803; H04L 12/2818; H04L 12/2832; H04L 2012/2841; H04L 12/2807;
(Continued)

(56) References Cited

U.S. PATENT DOCUMENTS 8,073,921 B2 *  12/2011  Thomas ................. G05B 15/02
                                                      709/208
8,537,021 B1 *  9/2013  Gordin .................... H02J 3/005
                                                      340/657

(Continued)

FOREIGN PATENT DOCUMENTS

JP    2007219985    8/2007
JP    4441430       3/2010
(Continued)

OTHER PUBLICATIONS

"International Search Report (Form PCT/ISA/210) of PCT/JP2018/011651," dated Apr. 24, 2018, with English translation thereof, pp. 1-4.

Primary Examiner — Lizbeth Torres-Diaz
(74) Attorney, Agent, or Firm — JCIPRNET

(57) ABSTRACT

A communication system includes housing equipment, a relaying apparatus that communicates with the housing equipment, and a management device that communicates with the relaying apparatus via a communication network. The management device is configured to store user identification information sent from a communication terminal that communicates with the management device via the communication network, and association information associated with identification information of the relaying apparatus sent from the relaying apparatus, and permit first communication via the management device between the communication terminal and the relaying apparatus that have been associated with each other in the association
(Continued)

information. After the first communication is permitted, if no communication is performed from the relaying apparatus or the communication terminal to the management device during a predetermined first period, the management device is configured to prohibit the first communication in and after the first period.

4 Claims, 3 Drawing Sheets

(58) Field of Classification Search
CPC .. H04L 41/0806; H04W 12/61; H04W 12/71; H04W 76/10; H04W 88/04
See application file for complete search history.

(56) References Cited

U.S. PATENT DOCUMENTS

| | | | | |
|---|---|---|---|---|
| 9,202,365 B2* | 12/2015 | Duchene | ................ | G08C 17/02 |
| 9,671,766 B2* | 6/2017 | Ha | .......................... | G05B 15/02 |
| 9,800,430 B2* | 10/2017 | Ha | .......................... | D06F 34/05 |
| 2002/0180581 A1* | 12/2002 | Kamiwada | ............ | H04L 63/083 |
| | | | | 340/5.2 |
| 2007/0130593 A1* | 6/2007 | Choi | .................. | H04N 21/4382 |
| | | | | 725/80 |
| 2009/0072991 A1* | 3/2009 | Hayashi | ................ | H04L 12/282 |
| | | | | 340/11.1 |
| 2012/0198533 A1* | 8/2012 | Thomas | .................. | G06F 21/00 |
| | | | | 726/7 |
| 2014/0250183 A1* | 9/2014 | Unagami | ............ | H04M 3/5166 |
| | | | | 709/204 |
| 2015/0372746 A1* | 12/2015 | Xie | ........................ | H04B 7/155 |
| | | | | 455/11.1 |
| 2021/0218571 A1* | 7/2021 | Ansari | ................ | H04M 15/705 |
| 2021/0329463 A1* | 10/2021 | Sugioka | ................. | H04M 11/00 |
| 2021/0383317 A1* | 12/2021 | Marzorati | .......... | G06Q 10/0832 |

FOREIGN PATENT DOCUMENTS

| | | | | |
|---|---|---|---|---|
| JP | 4695423 | 6/2011 | | |
| JP | 5046416 | 10/2012 | | |
| JP | 2017054363 | 3/2017 | | |
| JP | 2017054363 A | * 3/2017 | ............. | G06F 13/00 |
| WO | WO-2017113138 A1 | * 7/2017 | ............... | G06F 3/01 |

* cited by examiner

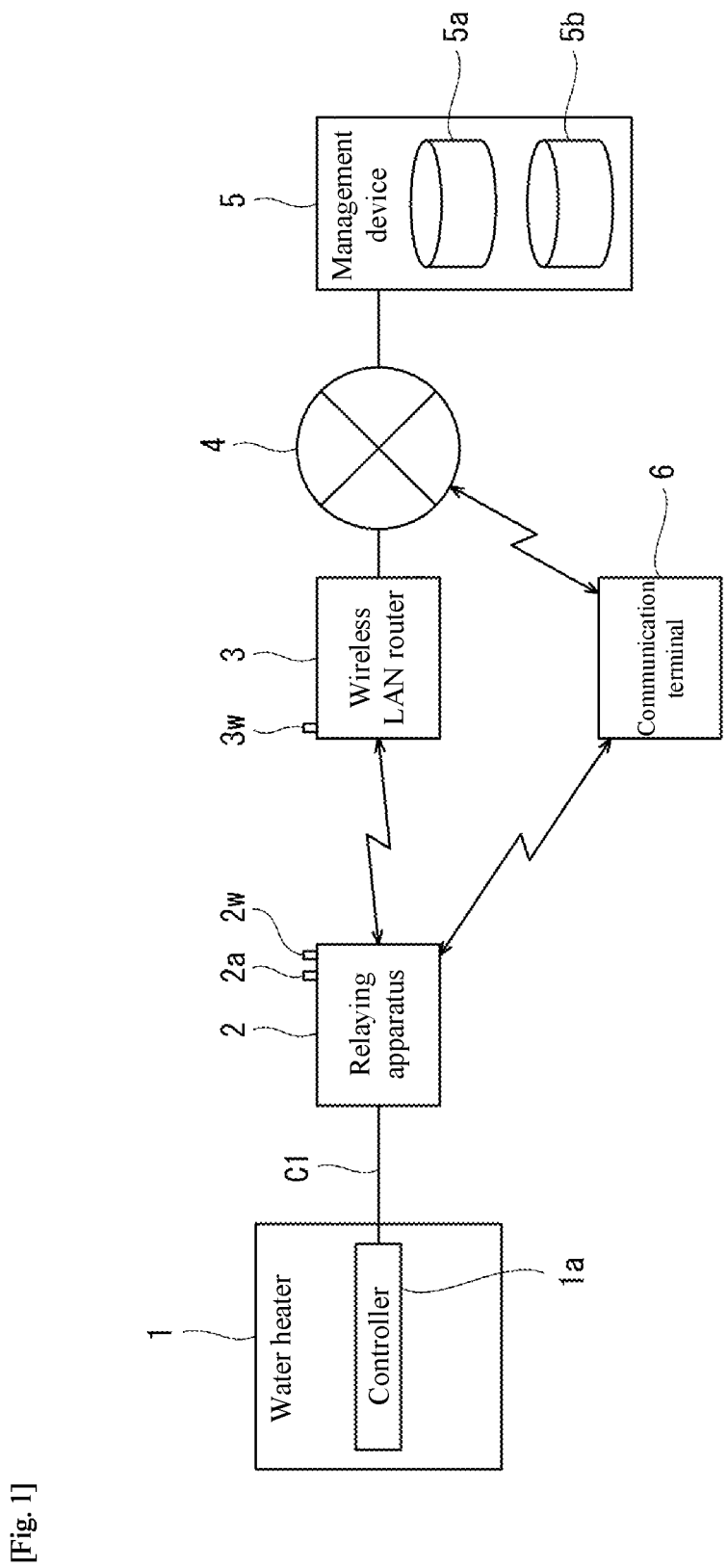
[Fig. 1]

[Fig. 2]
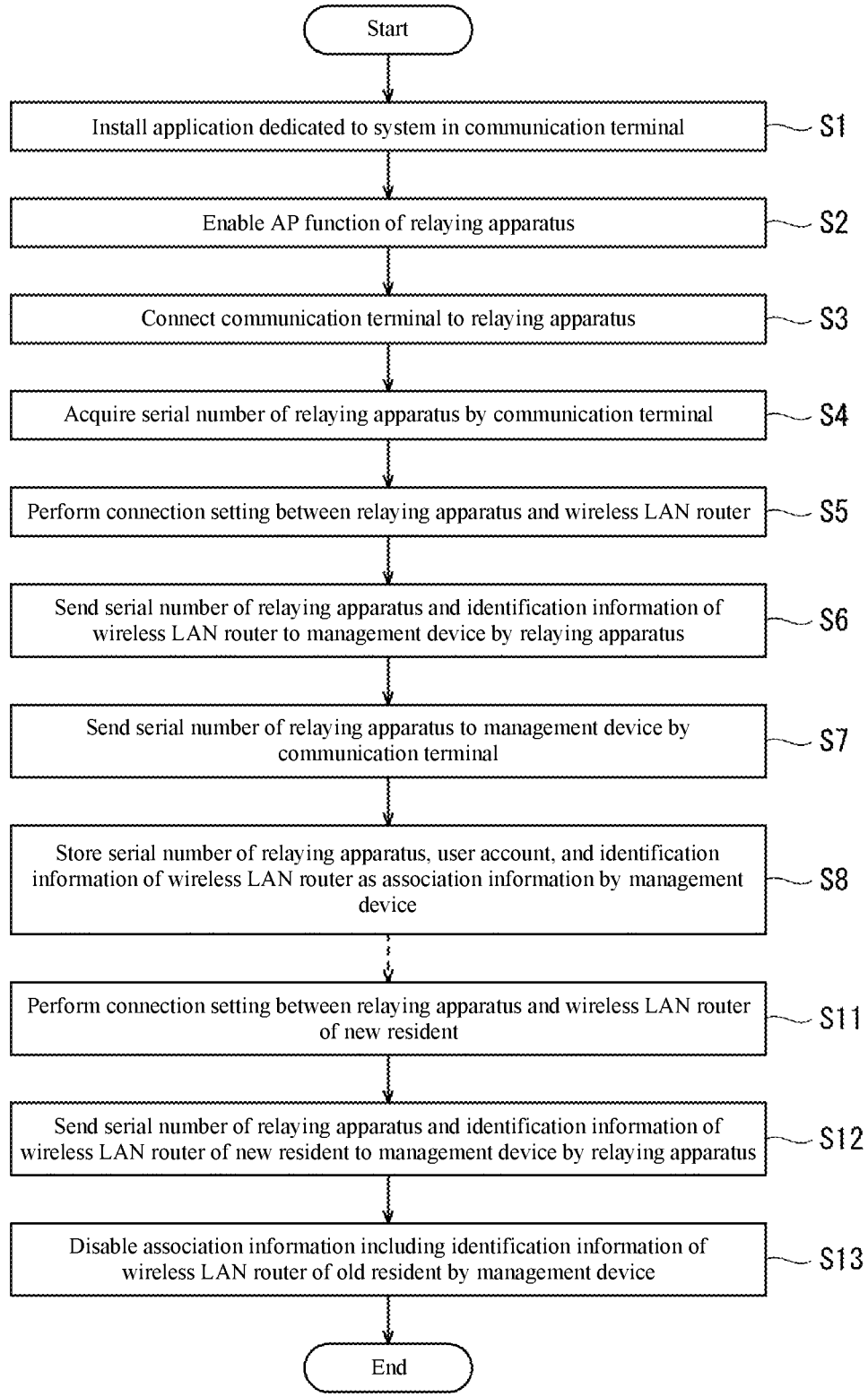

[Fig. 3]
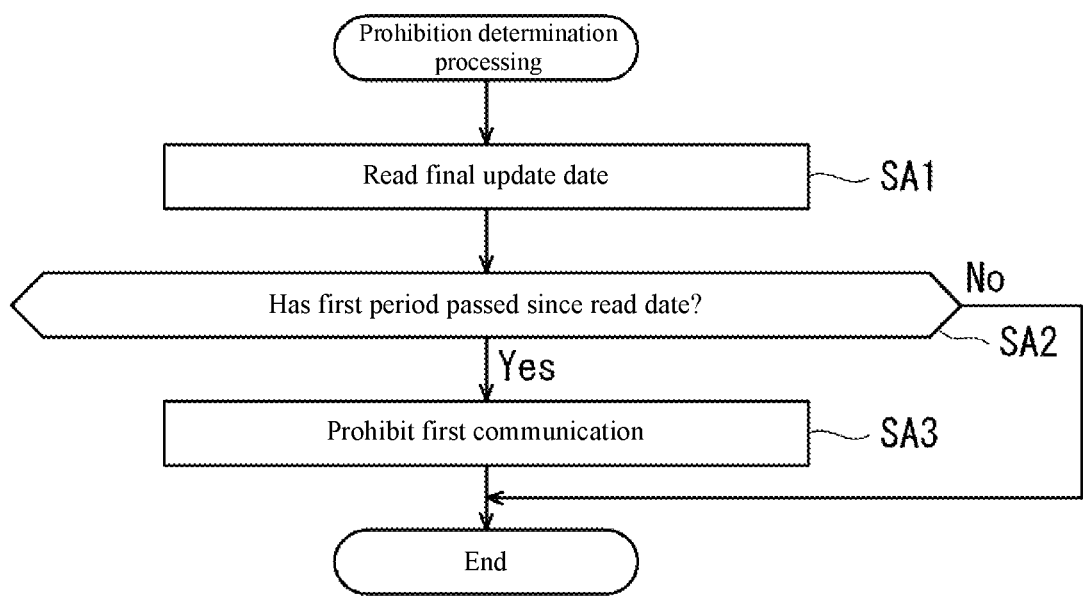

COMMUNICATION SYSTEM

CROSS-REFERENCE TO RELATED APPLICATION

This application is a 371 application of the International PCT application serial no. PCT/JP2018/011651, filed on Mar. 23, 2018, which claims priority benefits of Japan Patent Application No. 2017-076787 filed on Apr. 7, 2017 and Japan Patent Application No. 2017-076697 filed on Apr. 7, 2017. The entirety of each of the abovementioned patent applications is hereby incorporated by reference herein and made a part of this specification.

TECHNICAL FIELD

The present invention relates to a communication system for performing remote control and the like of housing equipment such as a water heater.

BACKGROUND ART

There has conventionally been known a system that uses a communication terminal such as a cellular phone to remotely control housing equipment. For example, Patent Literature 1 discloses the technique for remotely controlling electrical appliances and gas appliances in a house through use of an external terminal such as a cellular phone. Moreover, Patent Literatures 2 and 3 disclose the configuration in which equipment and a center device perform data communication via a communication network, a terminal device that remotely controls the equipment performs data communication with the center device via the communication network, and the center device performs data transfer between the terminal device and the equipment.

CITATION LIST

Patent Literature

PTL 1: JP 5046416 B2
PTL 2: JP 4441430 B2
PTL 3: JP 4695423 B2

SUMMARY OF INVENTION

Technical Problem

However, there is a case where, in order for a resident of a house to remotely control housing equipment through use of a communication terminal such as a cellular phone, a management device connected to a communication network is configured to receive a remote control command of the housing equipment from the communication terminal and send the remote control command to the housing equipment via the communication network. In this case, the management device is configured to transfer the remote control command from the communication terminal to the housing equipment based on association information of the communication terminal and the housing equipment.

Moreover, there is a case where, in order for the resident of the house to confirm a state of the housing equipment through the use of the communication terminal, a configuration is provided so as to send information that indicates the state of the housing equipment from the housing equipment to the management device, and the management device is configured to send the information that indicates the state of the housing equipment to the communication terminal based on the association information described above upon receiving, from the communication terminal, a request for information that indicates the state of the housing equipment.

In the cases described above, after the resident (old resident) of the house where the housing equipment is installed moves out, if the association information described above has not been changed, the old resident may be able to perform remote control and state confirmation of the housing equipment through the use of the communication terminal.

The present invention has been made to solve the problem described above and an object of the present invention is to provide a communication system capable of eliminating a request related to housing equipment by a communication terminal of an old resident.

Solution to Problem

In order to solve the above problem, a communication system according to an aspect of the present invention includes housing equipment, a relaying apparatus that communicates with the housing equipment, and a management device that communicates with the relaying apparatus via a communication network. The management device is configured to store user identification information sent from a communication terminal that communicates with the management device via the communication network, and association information associated with identification information of the relaying apparatus sent from the relaying apparatus, and permit first communication via the management device between the communication terminal and the relaying apparatus that have been associated with each other in the association information. After the first communication is permitted, in a case where no communication is performed from the relaying apparatus or the communication terminal to the management device during a predetermined first period, the management device is configured to prohibit the first communication in and after the first period.

According to this configuration, the first communication can be permitted between the relaying apparatus that communicates with the housing equipment and the communication terminal owned by the user (resident) of the applicable housing equipment via the management device. By so doing, the user of the housing equipment can make various requests (acquisition of information on the housing equipment, remote control of the housing equipment, and the like) with respect to the housing equipment through the use of the communication terminal. Moreover, after the first communication is permitted, if no communication is performed from the relaying apparatus or the communication terminal to the management device during the predetermined first period, the first communication is prohibited in and after the first period. That is, through detection of no communication having being performed from the relaying apparatus or the communication terminal to the management device during the first period, the management device determines that the resident has moved out and the use of the housing equipment has been stopped. As a result, the management device prohibits the first communication to the relaying apparatus for various requests with respect to the housing equipment by the communication terminal of the old resident who has moved out. Therefore, requests related to the housing equipment by the communication terminal of the old resident can be eliminated.

The communication from the relaying apparatus to the management device may include predetermined second communication that is periodically performed at intervals of a second period, which is shorter than the first period. The management device may be configured, in a case where no second communication is performed during the first period after the first communication is permitted, to prohibit the first communication in and after the first period. According to this configuration, in a case where no second communication is performed from the relaying apparatus to the management device during the first period, the second communication being to be periodically performed at intervals of the second period, which is shorter than the first period, the first communication is prohibited. Therefore, it can be reliably detected that communication from the relaying apparatus to the management device that is to be performed in a normal condition (during use by the resident) has not been performed during the first period.

The relaying apparatus may be configured to receive equipment state information that indicates a state of the housing equipment from the housing equipment, and periodically send the equipment state information to the management device as the second communication. According to this configuration, through the use of communication for storing the state of the housing equipment in the management device to determine whether to permit the first communication, the need for another communication for making the determination can be eliminated.

The management device may be configured to send, at a time of prohibiting the first communication, information on the prohibition of the first communication to the corresponding communication terminal. According to this configuration, the user of the communication terminal, who is the old resident, can be notified that he or she can no longer make requests related to the housing equipment.

A communication system according to another aspect of the present invention includes housing equipment, a relaying apparatus that communicates with the housing equipment, and a management device that is connected to a communication network and communicates with the relaying apparatus via the communication network and a wireless LAN router connected to the communication network. The management device associates identification information of the relaying apparatus and identification information of the wireless LAN router with user identification information of a communication terminal that communicates with the management device via the communication network in predetermined processing, stores these pieces of information as association information, and includes a control configuration that enables the stored association information. While the association information is enabled, when the identification information of the relaying apparatus and the identification information of the wireless LAN router are sent from the relaying apparatus, the management device determines whether the identification information of the wireless LAN router sent after the storage coincides with the identification information of the wireless LAN router associated with the identification information of the relaying apparatus based on the association information. When the identification information does not coincide, the management device is configured to disable the association information. At the same time, the management device is configured to, upon receiving request information related to the housing equipment together with the user identification information from the communication terminal, perform processing corresponding to the request information, only when the association information including the received user identification information is effective.

According to this configuration, the management device stores the association information by including the identification information of the wireless LAN router therein. By so doing, in a case where the old resident moves out and a new resident lives in the house, when the wireless LAN router is changed to the one owned by the new resident and connection setting is performed between the wireless LAN router of the new resident and the relaying apparatus, the association information including the identification information of the wireless LAN router of the old resident can be disabled. As a result, requests related to the housing equipment (requests for remote control and state confirmation of the housing equipment, for example) by the communication terminal of the old resident can be eliminated.

When the request information received from the communication terminal is remote control information for remotely controlling the housing equipment, and the association information is effective, the management device may be configured to send the remote control information to the relaying apparatus as processing corresponding to the request information. The relaying apparatus may be configured to send the received remote control information to the housing equipment.

According to this configuration, when the association information is effective, the housing equipment can be remotely controlled through the use of the communication terminal.

The relaying apparatus may be configured to receive equipment state information that indicates a state of the housing equipment from the housing equipment, and send the received equipment state information to the management device. The management device may be configured to store the received equipment state information. At the same time, when the request information received from the communication terminal is equipment state request information for requesting information on the state of the housing equipment, and the association information is effective, the management device may be configured to send the equipment state information to the communication terminal as processing corresponding to the request information.

According to this configuration, when the association information is effective, the state of the housing equipment can be confirmed through the use of the communication terminal.

The management device may be configured to send, at a time of disabling the association information, information on the disabling of the association information to the communication terminal.

According to this configuration, the old resident can be notified that he or she can no longer make requests related to the housing equipment.

The objects described above, other objects, characteristics and advantages of the present invention can be clarified from the following detailed description of preferred embodiments with reference to the attached drawings.

Advantageous Effects of Invention

The present invention includes the configurations described above and exhibits an effect of providing a communication system capable of eliminating a request related to housing equipment by a communication terminal of an old resident.

BRIEF DESCRIPTION OF DRAWINGS

FIG. 1 is a schematic configuration diagram of one example of a communication system according to an embodiment of the present invention.

FIG. 2 is a flowchart showing one example of procedures and the like for associating a serial number of a relaying apparatus with a user account and the like.

FIG. 3 is a flowchart exemplifying a flow of prohibition determination processing of first communication based on periodical communication of the present embodiment.

DESCRIPTION OF EMBODIMENTS

Hereinafter, preferred embodiments of the present invention will be described with reference to the drawings. Note that hereinafter, throughout all the drawings, same reference signs will denote the same or equivalent elements and overlapping descriptions thereof will be omitted. Moreover, the present invention is not limited to the following embodiments.

Embodiment

FIG. 1 is a schematic configuration diagram of one example of a communication system according to an embodiment of the present invention.

The communication system includes a water heater 1 as one example of housing equipment (combustion type water heater, for example), a relaying apparatus 2 dedicated to the water heater and communicably connected to a controller 1a that is incorporated in the water heater 1, and a management device 5 including a computer connected to a communication network 4 such as the Internet. The management device 5 communicates with the relaying apparatus 2 via the communication network 4 and a wireless LAN router 3 connected to the communication network 4. Moreover, a communication terminal 6 including a cellular phone or the like communicates with the management device 5 via the communication network 4 or the like. The communication system described above uses the communication network 4, the wireless LAN router 3, and the communication terminal 6. The wireless LAN router 3 and the communication terminal 6 are owned by a resident (user) of a house where the water heater 1 is installed.

Note that although the house where the water heater 1 is installed may be one, many units of the house normally exist, and that although the water heater 1 that configures the communication system may be one, many units of the water heater 1 normally exist. Here, representatively, only one unit of the water heater 1 is shown. The relaying apparatus 2, the wireless LAN router 3, and the communication terminal 6 that correspond to the water heater 1 only are also shown. Components shown in the drawing are described below.

The water heater 1 is installed in a predetermined location outside or inside the house, and has a hot water function that supplies hot water to a kitchen, a bathtub or the like. The water heater 1 includes a power supply portion (not shown) that generates a predetermined DC voltage through conversion of an AC voltage supplied from an external AC power supply (commercial power supply), uses the DC voltage generated in the power supply portion inside and, at the same time, supplies the DC voltage to the relaying apparatus 2 as a power supply voltage for operation of the relaying apparatus 2 via a two-core cable C1.

The relaying apparatus 2 is installed in a predetermined location outside or inside the house, and is connected to the controller 1a of the water heater 1 via the two-core cable C1. With this configuration, mutual communication (bidirectional communication) is performed between the relaying apparatus 2 and the controller 1a of the water heater 1 via the two-core cable C1. Here, in the two-core cable C1, communication information is superimposed on the power supply voltage for operation supplied from the power supply portion described earlier to the relaying apparatus 2.

Moreover, when connection setting of a wireless LAN is performed with the wireless LAN router 3, the relaying apparatus 2 can wirelessly communicate with the wireless LAN router 3 by the wireless LAN. The relaying apparatus 2 described above executes communication processing with the controller 1a of the water heater 1. At the same time, the relaying apparatus 2 executes communication processing with the management device 5 that is to be performed via the wireless LAN router 3 and the communication network 4. The relaying apparatus 2, for example, sends equipment information, sent from the controller 1a of the water heater 1, to the management device 5 via the wireless LAN router 3 and the communication network 4 through conversion of a communication mode. Moreover, the relaying apparatus 2 sends information, sent from the management device 5 via the communication network 4 and the wireless LAN router 3, to the controller 1a of the water heater 1 through conversion of a communication mode.

Furthermore, the relaying apparatus 2 has an access point (AP) function and is provided with an AP button 2a for activating the function.

In the wireless LAN router 3, a 48-bit basic service set identifier (BSSID) is set as identification information of the wireless LAN router 3, and delivers information such as a BSSID and a service set identifier (SSID) as a beacon at predetermined time intervals (100 ms, for example).

The management device 5 includes a storage portion 5a that stores association information. The association information is information in which a user account (user identification information) sent from the communication terminal 6 is associated with a serial number of the relaying apparatus 2 (identification information of the relaying apparatus 2). In addition, in the present embodiment, identification information (BSSID) of the wireless LAN router 3 is included in the association information.

The management device 5 also includes a storage portion 5b that stores equipment information sent from the relaying apparatus 2. Here, the equipment information includes equipment configuration information that is first sent from the controller 1a of the water heater 1 to the relaying apparatus 2 after power is supplied, operation state information that indicates an operation state of the water heater 1 and is periodically (at intervals of one hour, for example) sent from the controller 1a of the water heater 1 to the relaying apparatus 2, error information, and the like. Here, the equipment configuration information indicates the type and the like of the water heater 1, and the operation state information includes a hot water preset temperature, combustion operation frequency, combustion operation time, and the like of the water heater 1. The error information indicates, when some sort of abnormality occurs in the water heater 1, the abnormality, and is also displayed on a remote controller (not shown) of the water heater 1. The remote controller described above is connected to the controller 1a via a two-core cable.

The equipment information described above is sent from the relaying apparatus 2 to the management device 5 together with the serial number of the relaying apparatus 2. Then, the management device 5 associates the received equipment information with the serial number of the relaying apparatus 2 and sends the equipment information to the storage portion 5b.

The communication terminal 6 is a mobile terminal such as a smart phone, and is connectable to the communication network 4 via a base station and the like of a third generation (3G) or fourth generation (4G) cellular phone network. In addition, the communication terminal 6 is connectable to a wireless LAN.

If an application program dedicated to the communication system (hereinafter referred to as "application dedicated to the system") is installed in the communication terminal 6 described above and the association information is stored in the storage portion 5a of the management device 5, the communication terminal 6 can remotely control the water heater 1 and confirm the state of the water heater 1 via the management device 5 through the use of the user account associated with the serial number of the relaying apparatus 2. That is, the management device 5 permits the first communication via the management device 5 between the communication terminal 6 and the relaying apparatus 2 that have been associated with each other in the association information stored in the storage portion 5a.

Next, procedures and the like for associating (performing pairing) the serial number of the relaying apparatus 2 with the user account and the like will be described. FIG. 2 is a flowchart showing one example of procedures and the like for associating the serial number of the relaying apparatus 2 with the user account and the like.

Here, for example, a case where the water heater 1 and the relaying apparatus 2 are newly installed and a power supply of the water heater 1 is started is considered. Alternatively, a case where a resident moves into a house where the water heater 1 and the relaying apparatus 2 are installed and a power supply of the water heater 1 is started may be considered. Note that among the following procedures, procedures to be followed by the resident are described in a manual of the relaying apparatus 2.

In Step S1, the resident operates the communication terminal 6 to log in to a service site provided by a smart phone OS vender, and download and install the application dedicated to the system described earlier to the communication terminal 6. Then, the resident starts the application dedicated to the system installed in the communication terminal 6 and logs in to a user management site provided by the management device 5. After the resident logs in to the user management site, the user account is sent from the communication terminal 6 to the management device 5. At this time, if the resident does not have a user account yet, the resident creates a user account. The created user account is sent to the management device 5. By so doing, the management device 5 acquires the user account sent from the communication terminal 6. The user account includes an ID (email address of the communication terminal 6, for example) and a password, for example.

Next, in Step S2, the resident presses the AP button 2a of the relaying apparatus 2 to enable the AP function. By so doing, the relaying apparatus 2 delivers a beacon including an SSID.

Next, in Step S3, while the AP function of the relaying apparatus 2 is enabled, the communication terminal 6 is connected to the relaying apparatus 2. Specifically, the relaying apparatus 2 is selected from a list of access points (list of SSID) displayed on a screen of the communication terminal 6, and then an encryption key is entered. The SSID and the encryption key for the AP function of the relaying apparatus 2 are described on a label pasted on the relaying apparatus 2.

Next, in Step S4, after the communication terminal 6 is connected to the relaying apparatus 2 in Step S3 described above, the communication terminal 6 acquires the serial number of the relaying apparatus 2 from the relaying apparatus 2 by means of the application dedicated to the system, and stores the serial number in the storage portion inside the communication terminal 6. Specifically, the application dedicated to the system sends a request for the serial number to the relaying apparatus 2, and the relaying apparatus 2 responds to the request and sends the serial number to the communication terminal 6. Thereafter, the communication terminal 6 automatically sends, to the relaying apparatus 2, a command to disable the AP function of the relaying apparatus 2 by means of the application dedicated to the system. Through disabling of the AP function, the connection between the communication terminal 6 and the relaying apparatus 2 is cut off.

Next, in Step S5, the resident performs connection setting of the wireless LAN between the relaying apparatus 2 and the wireless LAN router 3. For example, a Wi-Fi protected setup (WPS) button 2w of the relaying apparatus 2 and a WPS button 3w of the wireless LAN router 3 are pressed so as to cause the connection setting to be automatically performed. At this time, the relaying apparatus 2 acquires a BSSID (MAC address of the wireless LAN router 3) serving as identification information of the wireless LAN router 3 and store the BSSID in the storage portion inside the relaying apparatus 2.

Next, in Step S6, after the connection setting with the wireless LAN router 3 is performed as described earlier, the relaying apparatus 2 sends the serial number of the relaying apparatus 2 and the identification information (BSSID) of the wireless LAN router 3 to the management device 5 via the wireless LAN router 3 and the communication network 4. At this time, the relaying apparatus 2 also sends the equipment configuration information of the water heater 1 that has been first acquired from the controller 1a of the water heater 1. The equipment configuration information described above is stored in the storage portion 5b inside the management device 5.

Next, in Step S7, the communication terminal 6 sends the serial number of the relaying apparatus 2 stored in the communication terminal 6 to the management device 5 by means of the application dedicated to the system. By so doing, the management device 5 acquires the serial number of the relaying apparatus 2 sent from the communication terminal 6.

Next, in Step S8, based on the user account acquired from the communication terminal 6 in Step S1, the serial number of the relaying apparatus 2 and the identification information (BSSID) of the wireless LAN router 3 acquired from the relaying apparatus 2 in Step S6, and the serial number of the relaying apparatus 2 acquired from the communication terminal 6 in Step S7, the management device 5 associates the same serial number of the relaying apparatus 2 acquired in Steps S6 and S7 with the user account and the identification information of the wireless LAN router 3, and then stores the information described above in the storage portion 5a as the association information. At this time, the association information described above is stored in the storage portion 5a as effective information.

After the connection setting is performed in Step S5 described earlier, and the equipment configuration information is sent from the relaying apparatus 2 to the management device 5 in Step S6, the relaying apparatus 2 periodically acquires the operation state information of the water heater 1 from the controller 1a and sends the information to the management device 5 (performs second communication). The interval of the second communication is a second period (one hour, for example), which is shorter than a first period described later. Moreover, after receiving the error information from the controller 1a, the relaying apparatus 2 sends the error information to the management device 5. The operation state information and the error information described above are stored in the storage portion 5b inside the management device 5.

Each of a plurality of relaying apparatuses 2 connected to a plurality of water heaters 1 is associated with a corresponding communication terminal 6 (of the resident). As a result, the management device 5 stores a plurality of association information pieces in the storage portion 5a. Note that one water heater 1 may be associated with a plurality of communication terminals 6 or a plurality of user accounts.

Then, after Step S8, the management device 5 permits the first communication via the management device 5 between the communication terminal 6 and the relaying apparatus 2 that have been associated with each other in the association information. By so doing, the resident can remotely control the water heater 1 and confirm the state of the water heater 1 (perform the first communication) through the use of the communication terminal 6.

Specifically, when remotely controlling the water heater 1, the resident operates the communication terminal 6 to log in to the user management site provided by the management device 5, and then sends the remote control information (command) for remotely controlling the water heater 1 to the management device 5. Then, the management device 5 refers to the association information including the user account acquired at the time of login, and sends the remote control information to the relaying apparatus 2 having the serial number included in the association information. The relaying apparatus 2 sends the received remote control information to the controller 1a. The controller 1a controls the water heater 1 based on the received remote control information. The remote control information includes an operation start command, an operation stop command, hot water supply temperature setting information of the water heater 1, and the like.

Moreover, when confirming the state of the water heater 1, the resident operates the communication terminal 6 to log in to the user management site provided by the management device 5, and then sends the equipment state request information for requesting information on the state of the water heater 1 to the management device 5. Then, the management device 5 refers to the association information including the user account acquired at the time of login, and sends, to the communication terminal 6, the equipment state information that has been received from the relaying apparatus 2 having the serial number included in the association information and has been stored in the storage portion 5b. Here, the equipment state information is information including the operation state information described earlier. The equipment state information may include the operation state information only, or the operation state information and the error information, for example.

Here, after the management device 5 permits the first communication between the communication terminal 6 and the relaying apparatus 2, if the resident moves out, the water heater 1 will not be used for a while with the power turned off. As a result, a state in which no power is supplied to the relaying apparatus 2 is maintained, and thus the periodical second communication from the relaying apparatus 2 to the management device 5 will not be performed.

In the present embodiment, after the first communication is permitted, if no second communication is performed from the relaying apparatus 2 to the management device 5 during the predetermined first period, the management device 5 prohibits the first communication in and after the first period.

As long as the first period is longer than the second period, the length of the first period is not particularly limited. For example, the first period is set as a period of one day or longer, or preferably a period between several days to several weeks.

FIG. 3 is a flowchart exemplifying a flow of prohibition determination processing of the first communication based on periodical communication of the present embodiment. The management device 5 stores a date when the first communication is permitted so as to include the date in the association information described above. Moreover, when receiving the second communication from the relaying apparatus 2 to the management device 5, the management device 5 stores the received operation state information of the water heater 1 in the storage portion 5b, and at the same time, associates the date of receiving the applicable second communication as a final update date with the corresponding association information, and then updates and stores the date in the storage portion 5a. The final update date is updated and stored every time the management device 5 receives the second communication. Note that after the first communication is permitted, until the first second communication is received, the final update date is set to the date when the first communication has been permitted.

The management device 5 reads the final update date associated with the association information stored in the storage portion 5a at a predetermined timing (Step SA1). The management device 5 determines whether the first period has passed since the applicable date that had been read at the applicable reading date (Step SA2).

If the first period has passed (Yes in Step SA2), the management device 5 disables the corresponding association information (cancels the pairing) to prohibit the first communication between the relaying apparatus 2 and the communication terminal 6 (Step SA3). Note that the management device 5 may delete the association information from the storage portion 5a in order to disable the association information. Alternatively, the management device 5 may leave the association information in the storage portion 5a while restoring the association information, which has been stored as effective information in the storage portion 5a, as ineffective information (information with ineffective association).

According to this configuration, after the first communication is permitted, if no communication is performed from the relaying apparatus 2 to the management device 5 during the predetermined first period, the first communication is prohibited in and after the first period. That is, through detection of no communication having been performed from the relaying apparatus 2 to the management device 5 during the first period, the management device 5 determines that the resident has moved out and the use of the water heater 1 has been stopped. As a result, the management device 5 prohibits the first communication to the relaying apparatus 2 for various requests with respect to the water heater 1 by the communication terminal 6 of the old resident who has moved out. Therefore, requests related to the water heater 1 by the communication terminal 6 of the old resident can be eliminated.

Moreover, as described earlier, in the present embodiment, in a case where no second communication is performed from the relaying apparatus 2 to the management device 5 during the first period, the second communication being to be periodically performed at intervals of the second period shorter than the first period, the first communication is prohibited. Therefore, it can be reliably detected that communication from the relaying apparatus 2 to the management device 5 that is to be performed in a normal condition (during use by the resident) has not been performed during the first period.

Furthermore, through the use of the second communication for storing the state of the water heater 1 in the management device 5 to determine whether to permit the first communication, the need for performing another communication for making the determination can be eliminated. Therefore, an increase in the communication volume can be suppressed.

In the present embodiment, the management device 5 is configured to send, at the time of prohibiting the first communication, information on the prohibition of the first communication to the corresponding communication terminal 6. For example, the management device 5 may send an email or the like indicating the prohibition of the first communication (association information being disabled) to the communication terminal 6. Alternatively, in the case of logging in to the user management site by the corresponding user account through the use of the communication terminal 6 after the first communication is prohibited, the management device 5 may display information indicating the first communication being prohibited on a display screen of the communication terminal 6 after login. According to the configuration described above, the user of the communication terminal 6, who is the old resident, can be notified that he or she can no longer make requests related to the water heater 1.

Next, in a case where, after the resident (old resident A) moves out to another house, another resident (new resident B) moves into the house where the water heater 1 is installed, the wireless LAN router 3 is replaced by the one owned by the new resident B in FIG. 1. Considering the wireless LAN router of the new resident B as a wireless LAN router 3b, the following description will be given.

If the new resident B performs the procedures of Steps S1 to S8, the association information stored in the management device 5 is changed and the new resident B can remotely control the water heater 1 and confirm the state of the water heater 1 by means of the communication terminal owned by the new resident B. On the other hand, if the new resident B does not perform the procedures of Steps S1 to S8, not only can the new resident B not remotely control the water heater 1 or confirm the state of the water heater 1 by means of the communication terminal owned by the new resident B, but also the water heater 1 will not be managed by the management device 5. The management of the water heater 1 by the management device 5 includes, for example, sending error information from the management device 5 to the communication terminal 6 upon receiving the error information from the relaying apparatus 2, sending the error information from the management device 5 to an information processor of a maintenance provider, predicting a service life of a component member of the water heater 1 by the management device 5 based on the operation state information and the like, and sending a replacement period of the component member to the communication terminal 6 and/or the information processor of the maintenance provider.

However, if the new resident B, for example, does not need to remotely control the water heater 1 or confirm the state of the water heater 1, or tries to only manage the water heater 1 by the management device 5 without knowing that the new resident B can perform remote control or state confirmation, as shown in FIG. 2, only Steps S11 and S12, which are similar to Steps S5 and S6, shall be performed. According to the configuration above, the new resident B just needs to press the WPS button 2w of the relaying apparatus 2 and the WPS button 3w of the wireless LAN router 3b of the new resident B, and this is a simple operation.

In this case, in Step S11, through pressing of the WPS button 2w of the relaying apparatus 2 and the WPS button 3w of the wireless LAN router 3b by the new resident B, the connection setting of the wireless LAN is performed between the relaying apparatus 2 and the wireless LAN router 3b of the new resident B. Then, in Step S12, the relaying apparatus 2 sends the serial number of the relaying apparatus 2 together with the BSSID acquired from the wireless LAN router 3b in Step S11 to the management device 5 via the wireless LAN router 3b and the communication network 4.

Next, in Step S13, the management device 5 compares the serial number of the relaying apparatus 2 acquired from the relaying apparatus 2 in Step S11 and the identification information (BSSID) of the wireless LAN router 3b with the association information stored as effective information in the storage portion 5a, and then disables the association information based on the comparison result.

Specifically, the management device 5 refers to the association information including the serial number of the relaying apparatus 2 acquired in Step S11, and determines whether the identification information of the wireless LAN router included in the association information coincides with the identification information of the wireless LAN router 3b. If the identification information does not coincide, the management device 5 disables the association information described above to cancel the association between the serial number of the relaying apparatus 2 and the user account. In the case of this example, the association information described above includes the identification information of the wireless LAN router 3 of the old resident A. Since the identification information does not coincide with the identification information of the wireless LAN router 3b acquired in the manner described above, the association information is disabled. Note that in order to disable the association information, the management device 5 may delete the association information from the storage portion 5a, or may leave the association information in the storage portion 5a as ineffective information (information with ineffective association).

In the present embodiment, the relaying apparatus 2 is configured to send the serial number of the relaying apparatus 2 and the identification information (BSSID) of the wireless LAN router 3 to the management device 5 immediately after the connection setting of the wireless LAN is performed between the relaying apparatus 2 and the wireless LAN router 3. At the same time, the management device 5 is configured to store the association information by including the identification information of the wireless LAN router 3 therein. By so doing, in a case where the old resident moves out and the new resident lives in the house, when the wireless LAN router is changed to the one owned by the new resident and the connection setting is performed between the wireless LAN router of the new resident and the relaying apparatus 2, the association information including the identification information of the wireless LAN router of the old resident can be disabled. As a result, remote control and state confirmation of the water heater 1 by the communication terminal of the old resident can be inhibited.

On the other hand, if the management device 5 identifies the serial number of the relaying apparatus 2 and the user account only as the association information without including the identification information of the wireless LAN router as the association information, even when the new resident presses the WPS button 2w of the relaying apparatus 2 and the WPS button 3w of the wireless LAN router 3b and the connection setting is performed between the relaying apparatus 2 and the wireless LAN router 3b of the new resident B, the association information cannot be disabled. In this case, the relaying apparatus 2 and the management device 5 are communicable with each other, and thus the water heater 1 may be remotely controlled or the state of the water heater 1 may be confirmed by the communication terminal of the old resident. According to the present embodiment, the remote control and the state confirmation of the water heater 1 by the communication terminal of the old resident described above can be reliably prevented.

Moreover, in the present embodiment, for example, after Steps S11 to S13 are performed, the management device 5 may report the association information having been disabled, for example, the remote control and the state confirmation of the water heater 1 having been disabled, by sending an email or the like to the communication terminal 6 of the old resident. By so doing, the old resident can know that he or she can no longer remotely control the water heater 1 or confirm the state of the water heater 1.

From the above description, many modifications and other embodiments of the present invention are apparent to a person skilled in the art. Therefore, the foregoing description should be interpreted only as an example, and has been provided for the purpose of teaching the best mode for carrying out the present invention to a person skilled in the art. Without departing from the spirit of the present invention, the details of the construction and/or function can be substantially changed.

For example, in the present embodiment, a configuration is provided so as to determine whether to prohibit the first communication according to whether the second communication to be periodically performed from the relaying apparatus 2 to the management device 5 has been performed during the first period. Alternatively, the management device 5 may determine whether to prohibit the first communication according to whether all the communication to be performed between the relaying apparatus 2 and the management device 5 has been performed during the first period, or may determine whether to prohibit the first communication according to whether predetermined communication to be performed between the relaying apparatus 2 and the management device 5 has been performed during the first period. Moreover, the management device 5 may determine whether to prohibit the first communication according to whether communication to be performed between the communication terminal 6 and the management device 5 has been performed during the first period.

Alternatively, the management device 5 may monitor both of the communication to be performed between the relaying apparatus 2 and the management device 5 and the communication to be performed between the communication terminal 6 and the management device 5, and if one communication has not been performed during the first period, the management device 5 may prohibit the first communication even when the other communication has been performed during the first period.

Moreover, in the present embodiment, a configuration that includes the identification information (BSSID) of the wireless LAN router 3 in the association information has been described. However, in order to determine whether to prohibit the first communication according to whether communication has been performed during the first period, the identification information of the wireless LAN router 3 does not need to be included in the association information.

Moreover, in the present embodiment, a configuration is provided so as to perform both of the remote control and the state confirmation of the water heater 1 through the use of the communication terminal 6. However, the configuration may be provided so as to perform either one of the remote control and the state confirmation of the water heater 1.

Moreover, the management device 5 may be configured to be divided into a plurality of devices, and function as the management device 5 through cooperation among the plurality of devices. For example, the storage portions 5a and 5b of the management device 5 may be configured as different devices than a computer that performs various operations. Moreover, the communication system may be configured to perform various operations of the management device 5 by a plurality of computers.

In addition, the water heater 1 has been exemplified as housing equipment, but housing equipment is not limited thereto. Any equipment is applicable as long as the equipment is configured to be communicable with the management device 5 via the relaying apparatus 2 and the wireless LAN router 3.

INDUSTRIAL APPLICABILITY

The present invention is useful as a communication system or the like capable of eliminating a request related to housing equipment by a communication terminal of an old resident.

The invention claimed is:
1. A communication system comprising:
housing equipment;
a relaying apparatus that communicates with the housing equipment; and
a management device that is connected to a communication network and communicates with the relaying apparatus via the communication network and a wireless LAN router connected to the communication network,
wherein the management device associates identification information of the relaying apparatus and identification information of the wireless LAN router with user identification information of a communication terminal that communicates with the management device via the communication network in predetermined processing,
the management device stores these pieces of information as association information,
the management device includes a control configuration that permits the stored association information to be used,
while the association information is permitted to be used, when the identification information of the relaying apparatus and the identification information of the wireless LAN router are sent from the relaying apparatus to the management device, the management device determines whether the identification information of the wireless LAN router sent to the management device after the storage matches the identification information of the wireless LAN router associated with the identification information of the relaying apparatus by comparing the identification information of the wireless LAN router received by the management device with the stored association information, in a case where the identification information of the wireless LAN router received by the management device does not match the stored association information, the management device is configured to disable the association information, and upon receiving request information related to the housing equipment together with the user identification information from the communication terminal, the management device is configured to perform processing corresponding to the request information, only when the association information including the received user identification information is valid.

2. The communication system according to claim 1,
wherein when the request information received from the communication terminal is remote control information for remotely controlling the housing equipment, and the association information is valid, the management device is configured to send the remote control information to the relaying apparatus as processing corresponding to the request information, and the relaying apparatus is configured to send the received remote control information to the housing equipment.

3. The communication system according to claim 1,
wherein the relaying apparatus is configured to receive equipment state information that indicates a state of the housing equipment from the housing equipment, and send the received equipment state information to the management device, the management device is configured to store the received equipment state information, and when the request information received from the communication terminal is equipment state request information for requesting information on the state of the housing equipment, and the association information is valid, the management device is configured to send the equipment state information to the communication terminal as processing corresponding to the request information.

4. The communication system according to claim 1,
wherein the management device is configured to send, at a time of disabling the association information, information on the disabling of the association information to the communication terminal.

\* \* \* \* \*